(12) United States Patent
Chen

(10) Patent No.: US 6,266,543 B1
(45) Date of Patent: Jul. 24, 2001

(54) ELECTRONIC PHONE BOOK DIALING SYSTEM COMBINED WITH A VEHICLE-INSTALLED HAND-FREE SYSTEM OF A CELLULAR PHONE

(75) Inventor: Tonny Chen, Chang-Hua (TW)

(73) Assignee: E-Lead Electronic Co., Ltd., Chang-Hua (TW)

( * ) Notice: Subject to any disclaimer, the term of this patent is extended or adjusted under 35 U.S.C. 154(b) by 0 days.

(21) Appl. No.: 09/325,719

(22) Filed: Jun. 4, 1999

(51) Int. Cl.[7] .................................................. H04B 1/38
(52) U.S. Cl. ........................ 455/569; 455/564; 455/460
(58) Field of Search .................................. 455/460, 564, 455/565, 569; 379/216, 359

(56) References Cited

U.S. PATENT DOCUMENTS

| | | | |
|---|---|---|---|
| 5,247,565 | * | 9/1993 | Joglekar et al. ..................... 455/564 |
| 5,535,260 | * | 7/1996 | Zicker et al. ........................ 455/564 |
| 5,722,087 | * | 2/1998 | Ale-Mursula et al. .............. 455/564 |
| 5,963,875 | * | 10/1999 | Go ........................................ 455/564 |
| 5,999,827 | * | 12/1999 | Sudo et al. ............................ 455/564 |
| 6,021,335 | * | 2/2000 | Zicker et al. ........................ 455/564 |
| 6,101,401 | * | 8/1998 | Mou et al. ............................ 455/564 |
| 6,138,038 | * | 10/2000 | Huotari ................................. 455/564 |

* cited by examiner

Primary Examiner—William Trost
Assistant Examiner—Tilahun Gesesse
(74) Attorney, Agent, or Firm—Rosenberg, Klein & Lee (57) ABSTRACT

An electronic phone book dialing system is combined with a vehicle-installed hand-free system of a cellular phone. In particular, the dialing system can automatically dial out phone numbers including an extension number stored in an electronic memory unit. A person can make use of simple code names, personal names or phonetic sounds as indexes for locating telephone numbers stored in an electronic memory unit. Thereby, a person can make a hand-free system to automatically dial out a selected phone number with an extension in response to a person's simple selection of a representing code name, personal name or phonetic sound. It can thus facilitate a person to dial a phone number in driving.

3 Claims, 8 Drawing Sheets

ELECTRONIC PHONE BOOK DIALING SYSTEM COMBINED WITH A VEHICLE-INSTALLED HAND-FREE SYSTEM OF A CELLULAR PHONE

BACKGROUND OF THE INVENTION

The present invention relates to an electronic phone book dialing system which is combined with a vehicle-installed hand-free system of a cellular phone, and more particularly to a dialing system which can automatically dial out phone numbers including an extension number stored in an electronic memory unit in advance. A person can make use of simple code names, people's names or phonetic sounds as indexes for locating telephone numbers stored in an electronic memory unit. Thus a person can make a hand-free system to automatically dial out a selected phone number with an extension in response to a person's simple selection of a representing code name, person's name or phonetic sound. It facilitates a person to dial out a phone number in driving in a more secure and easier manner.

In a busy commerce-oriented society, frequent communication or close association among people is more and more unavoidable. Advancement in technologies of cellular phones has made such close connection easier and faster. It is commonly seen that cellular phones are operated in cooperation with a hand-free system mounted onto a vehicle, and people are becoming more and more dependent of such mobile phones when driving on roads or staying outdoors. However, a bunch of phone numbers becomes troublesome to most people who are not good at keeping phone numbers in memory by rote.

So, there are prior art electronic phone books or electronic dialing devices developed and sold in markets to solve the cited problems. However, the conventional electronic dialing devices can not either dial out phone numbers with extension or operate in match with cellular phones and hand-free systems in vehicles. They can only serve as an electronic phone book in many cases.

Noticing the disadvantages of prior art electronic dialing devices and the potential advantages and facility of an electronic dialing device, the present inventor has devoted his effort and time to the development and improvement on such an electronic dialing device. This dialing device can search for a phone number stored in a memory unit and represented by an index such as a code name, a personal name or phonetic sound and make a dial automatically without resorting to a manual phone book or note. Thereby, a person can make a call by automatically dialing out a phone number even with an extension portion.

SUMMARY OF THE INVENTION

Therefore, the primary object of the present invention is to provide an electronic phone book dialing system in combination with a vehicle-installed hand-free system of a cellular phone. The dialing system can automatically dial out telephone numbers with extensions stored in an electronic memory unit in advance, by simple selection of a code name, or a personal name or phonetic sound. Thus, it enables people dial out phone numbers readily in driving without resorting to manual phone books awkwardly.

DETAILED DESCRIPTION OF THE PREFERRED EMBODIMENT

Figure 1:
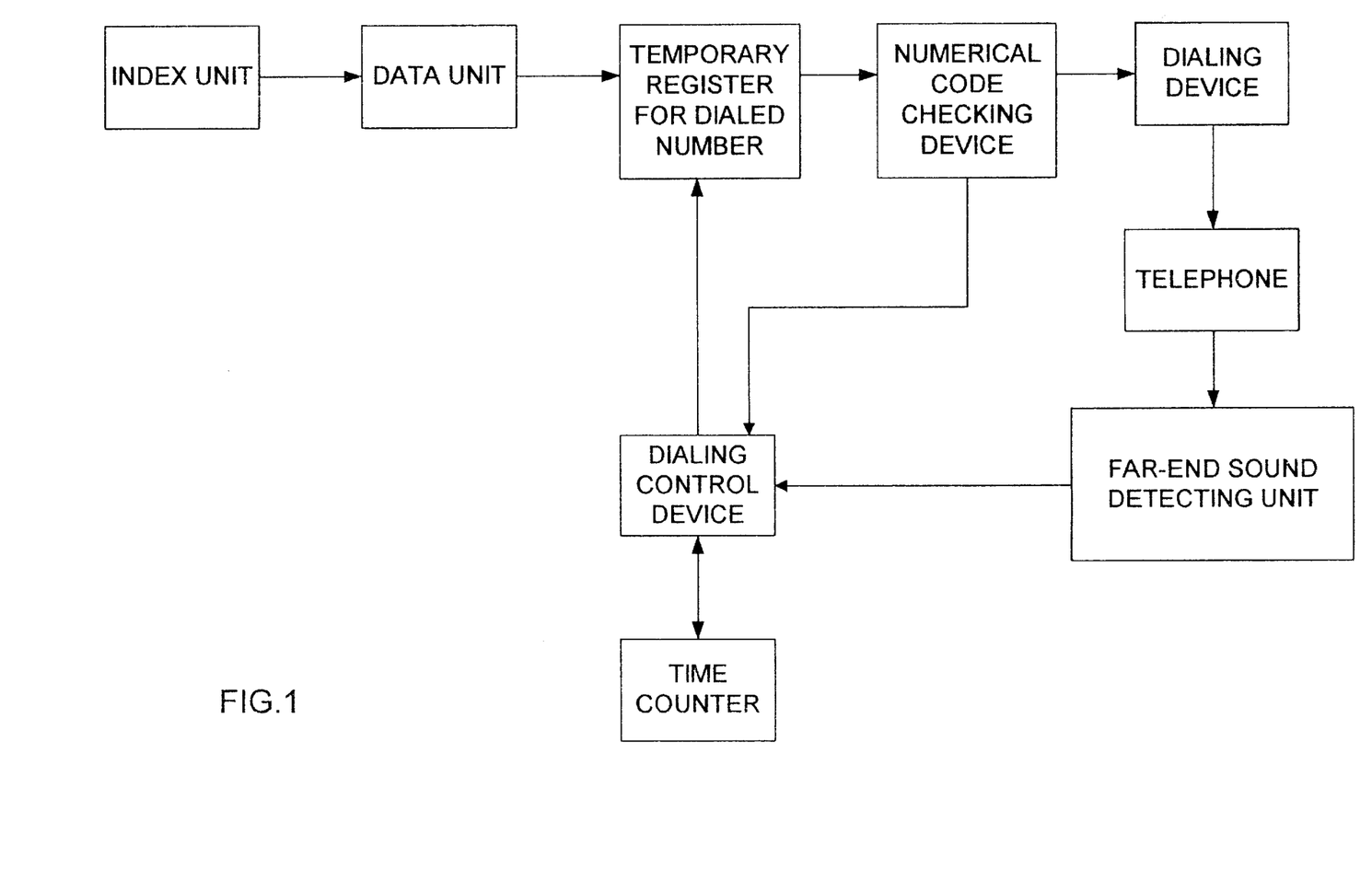
FIG. 1 is a block diagram showing the system of the first embodiment of the present invention.

Referring to FIG. 1, a block diagram showing a first practical embodiment of the present invention. The electronic phone book dialing system of the present invention combined with a vehicle-installed hand-free system of a cellular phone is disclosed. It is comprised of an index unit 11, a data pool 12, a temporary register 13 for dialed numbers, a numerical code checking device 14, a dial control device 16, a dialing device 15, a time counter 17 and a far-end sound detecting unit 18.

The index unit 11 is responsible for locating a key phone number data stored therein for the dialing system as an abridged index information related to a to-be-dialed phone number is input. Thus complete phone data related to the phone number can be located in the data pool 12.

The data pool 12 is used to store all kinds of telephone number data applied to the dialing system of the present invention.

The temporary register 13 for dialed phone numbers is used to temporarily retain telephone numbers dialed in the dialing system at a moment.

The numerical code checking device 14 is used to check for the dialing system of the present invention if each code delivered from the temporary register 13 for dialed numbers is within a range from 0 to 9. That enables the dialing system to discern if input codes are associated with an extension number.

The dial control unit 16 is used to hold a dialing of an extension number for a short time as a telephone associated with a dialed number is successfully connected at another end, permitting an addressing message of the telephone in connection to be delivered.

The dialing device 15 is responsible for dialing out digital numbers transmitted from the numerical code checking device 14 for the dialing system of the present invention.

The far-end sound detecting device 18 is used to detect if an addressing message at other end of a connected phone is broadcast or not.

The time counter 17 is used to count time in a temporary holding of a dialing operation for the dialing system of the present invention.

The electronic phone book dialing system of the present invention combined with a vehicle-installed hand-free system of a cellular phone can make a dial by inputting an index represented in a simple code name, a personal name or phonetic sound. Due to diversity of input methods and not being of major concern of the present invention, the input methods are not described herein.

Figure 2:
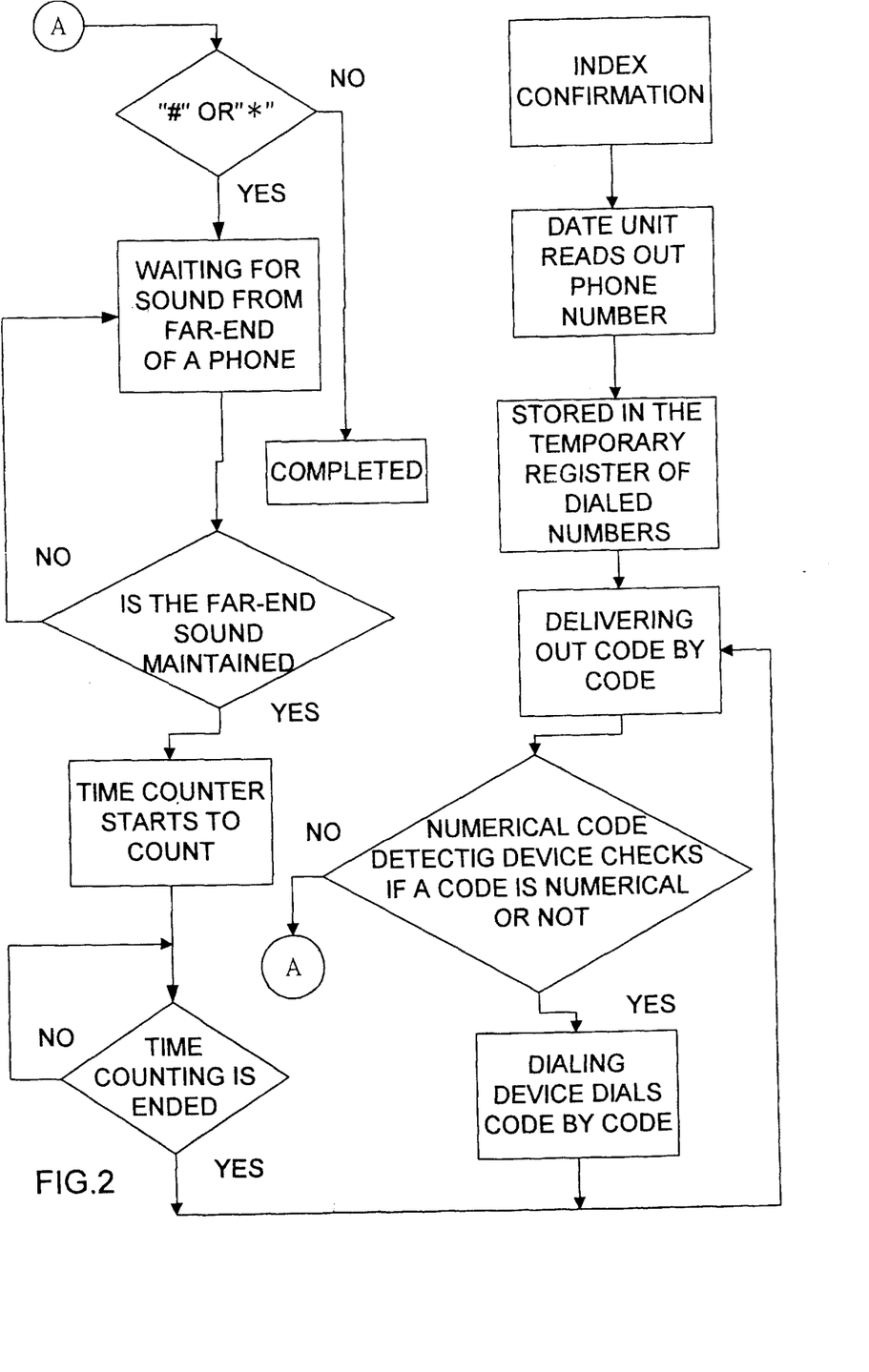
FIG. 2 is a diagram showing the operational flow chart of the present invention.
Figure 3:
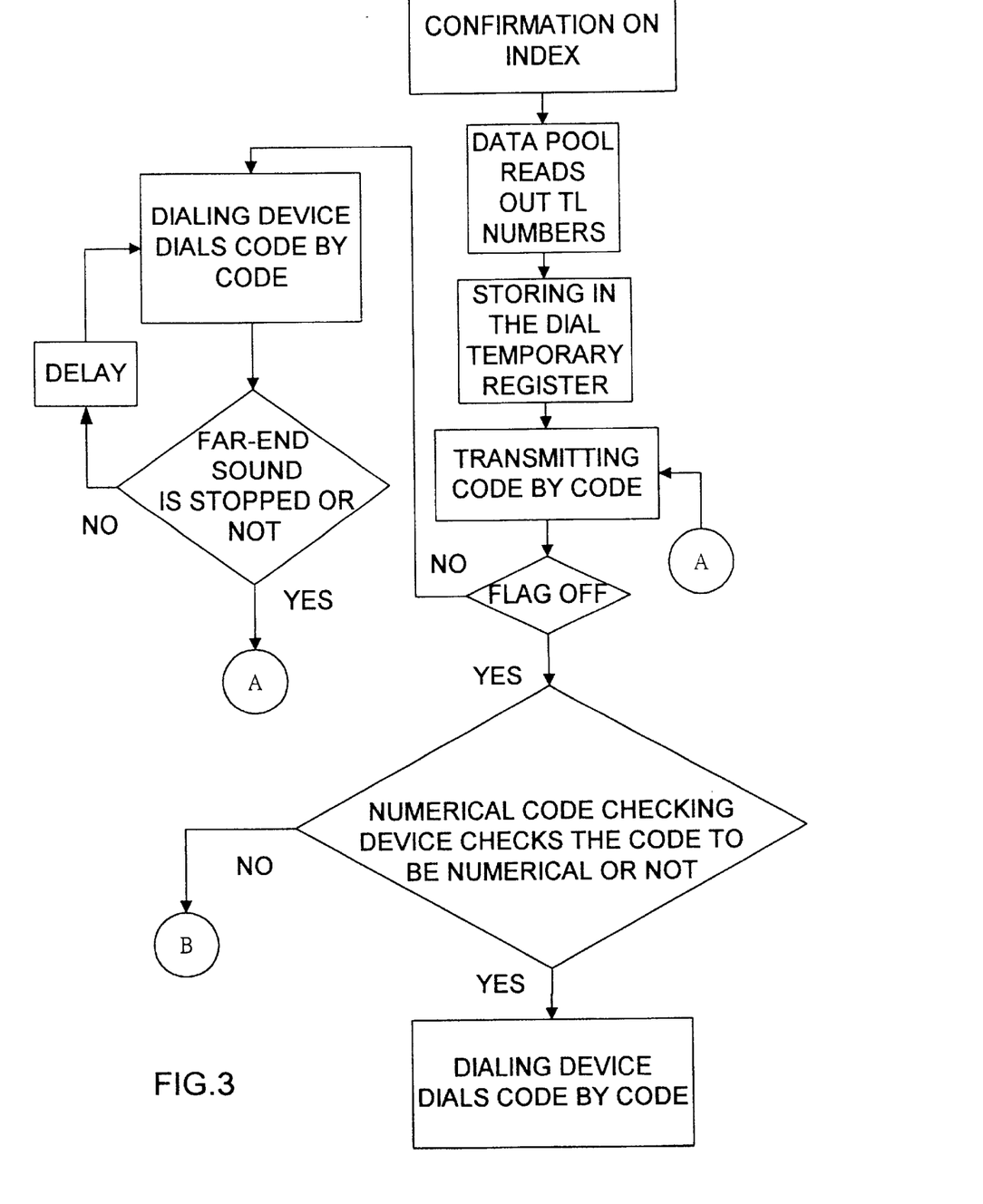
FIG. 3 is a diagram showing a part of another operational flow chart thereof.
Figure 3A:
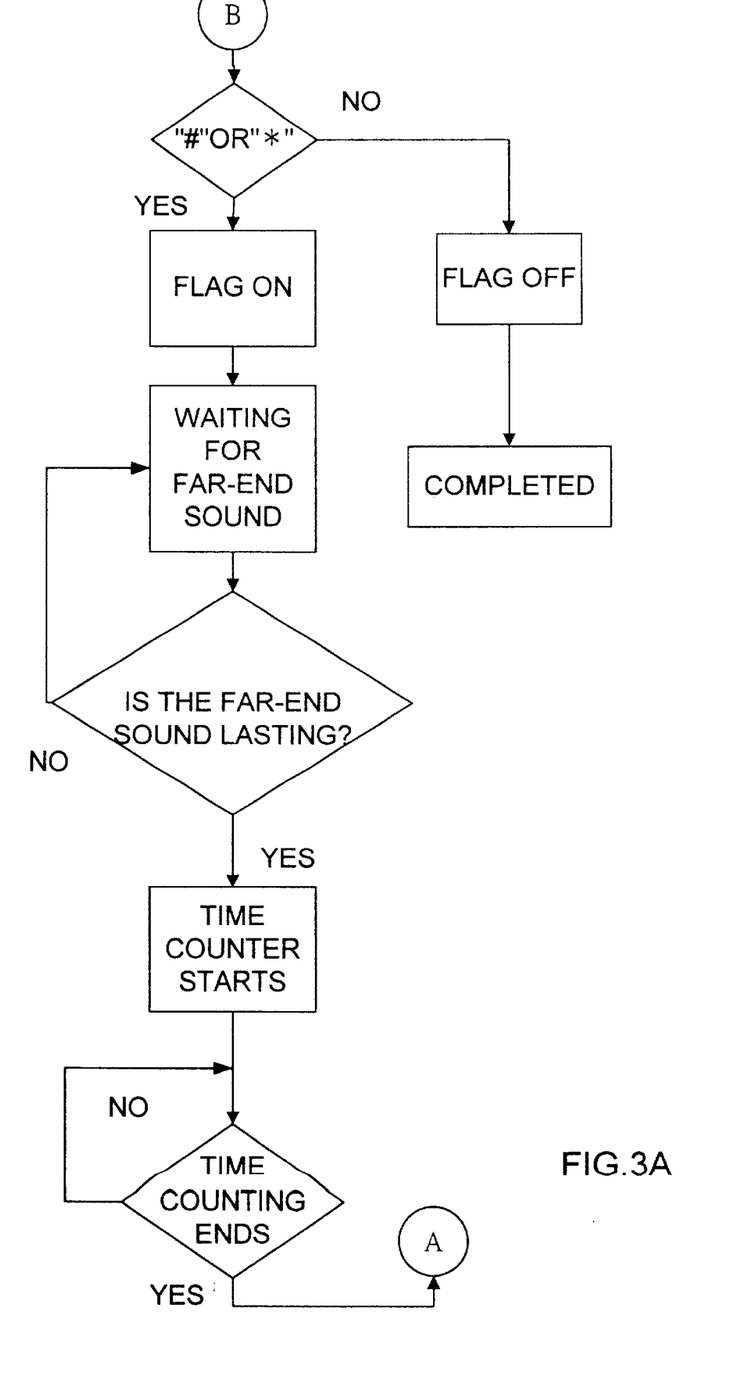
FIG. 3A is a diagram showing the other part of another operational flow chart thereof.

Referring to FIG. 2, the flow chart of the present invention is illustrated. As the index unit 11 confirms on an input index, it will read out a phone number, which is stored in the temporary register 13 first. In case of an input phone number with an extension being 0227380007#512, # is an identifying code for an extension number. Then, the temporary register 13 delivers the phone number code by code to the numerical code checking device 14 to identify if the input codes are numerals from 0 to 9. If the dial is carried out by the dialing device 15 code by code and the code is not a numeral from 0 to 9 but a code denoting # or *, the dial control unit 16 will put off the dialing operation temporarily. At the same time the time counter 17 is activated to count until the response of the far-end sound detecting device 18 is positive. If the far-end sound detecting device 18 confirms that the telephone 2 at the other end is picked or hooked up (the judgement of the pick-up can be performed by way of time count or acoustic range judgement and etc.), the time counter 17 starts to count. It intends to delay till the broadcast of an addressing message. At the stop of the counting, the temporary register 13 begins to send off an extension number and the numerical code checking device 14 keeps on operation until a blank code is detected to complete the dialing operation. This state can take place only when the call-receiving end permits an extension number to be input even in the broadcasting procedure of an addressing message of the telephone. If the call-receiving end does not accept the input of an extension number then, as shown in FIGS. 3 and 3A, the far-end sound detecting device 18 will detect on the addressing message at the call-receiving end and starts accordingly a flag function with an initial value set as "ON". After the dialing device 15 makes a dial, the far-end sound detecting device 18 checks if the sound at the other end lasts or not. If the sound lasts, the dialing control unit 16 will hold for a short time and then make a dial again till the far-end detecting device 18 receives no sound at the far-end. Afterwards, the temporary register 13 will continue to dispatch data whereby phone numbers with an extension can be directed dialed out, facilitating the dialing operation of users.

Figure 4:
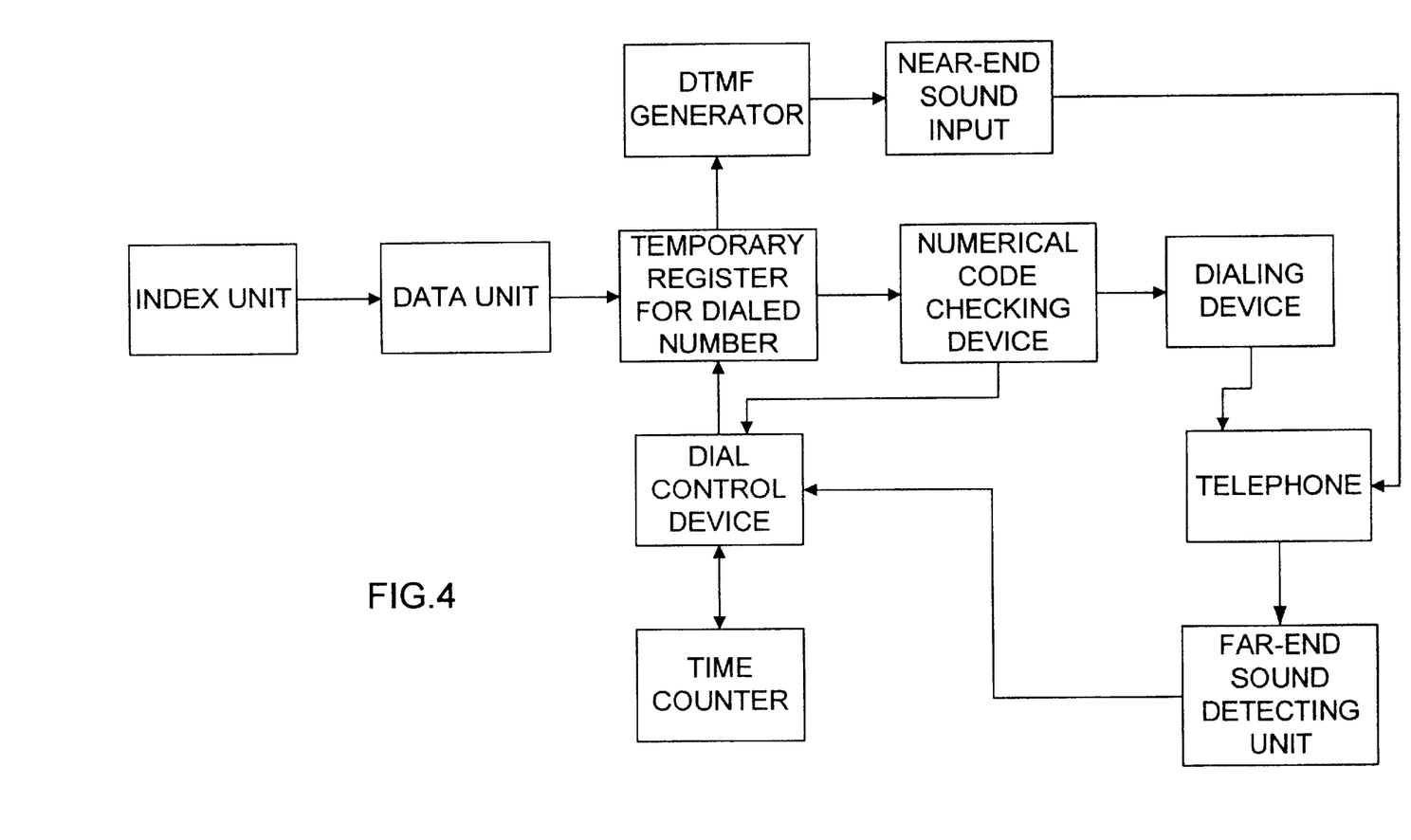
FIG. 4 is a diagram showing the system of a second embodiment of the present invention.
Figure 5:
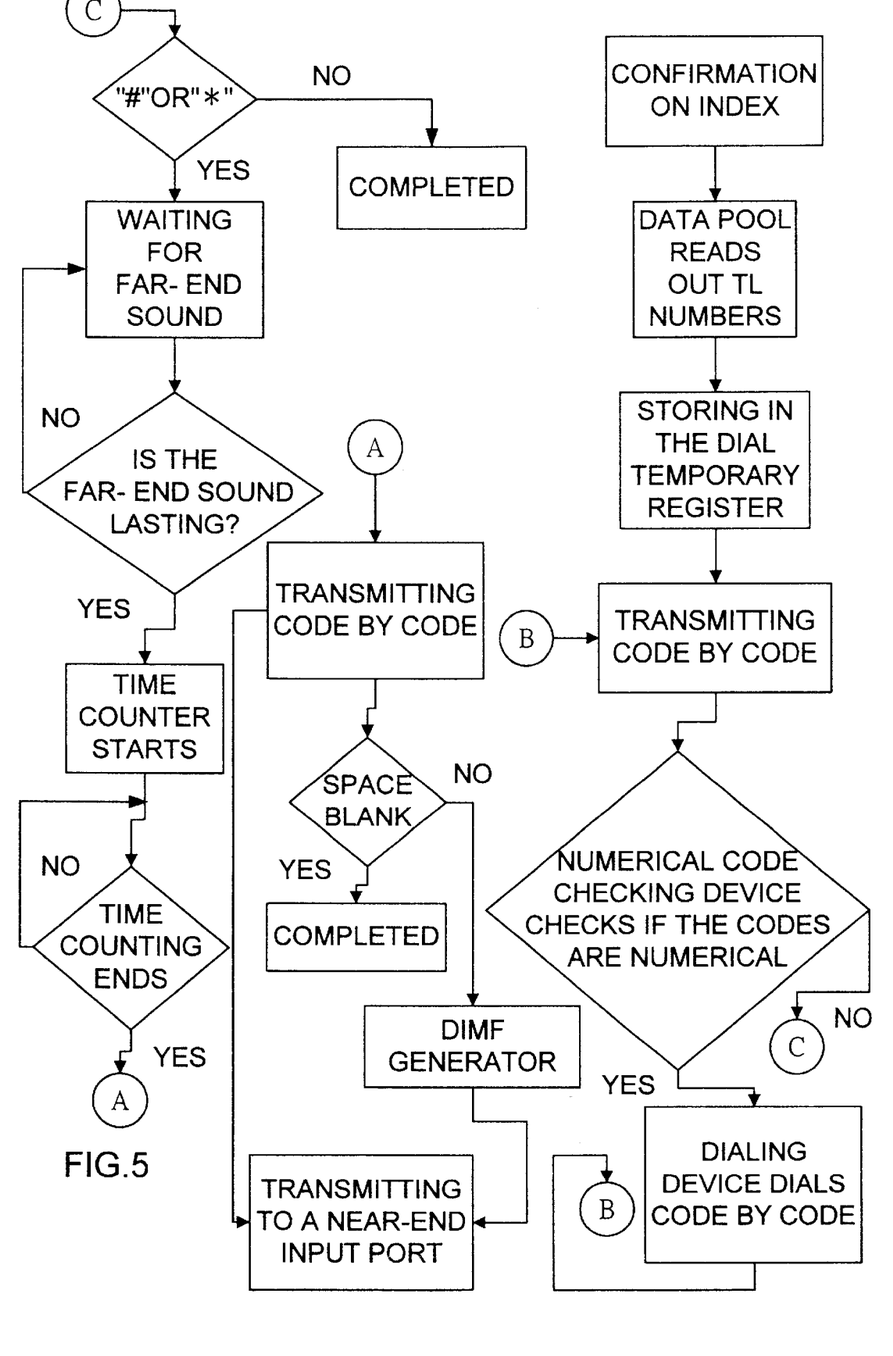
FIG. 5 is a diagram showing the operational flow chart of the second embodiment thereof.

Referring to FIGS. 4, 5, another embodiment of the present invention is disclosed. It intends to make an application to those telephones, which can not dial out numbers by buttons in a course of a dialing operation. Such an embodiment is comprised of a collection of basic elements of an index unit 31, a data pool 32, a dial temporary register 33, a numerical code detecting device 34, a dialing control unit 36, a dialing device 35, a time counter 37 and a far-end sound detecting device 38 and an additional DTMF generator 39 in cooperation with a near-end sound input 30 which produces dialing tone representing numbers.

Figure 6:
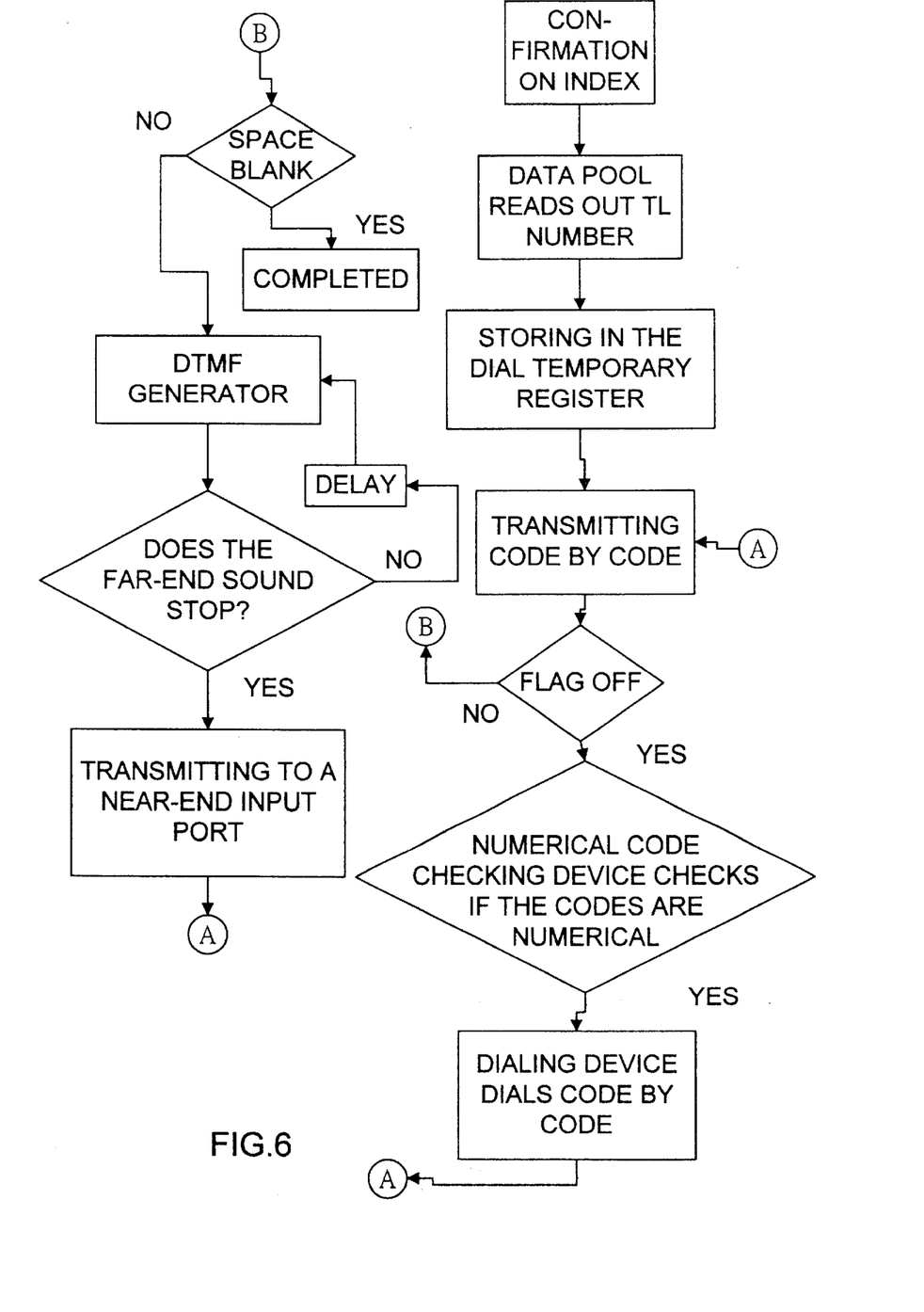
FIG. 6 is a diagram showing a part of another operational flow chart of the second embodiment thereof.
Figure 6A:
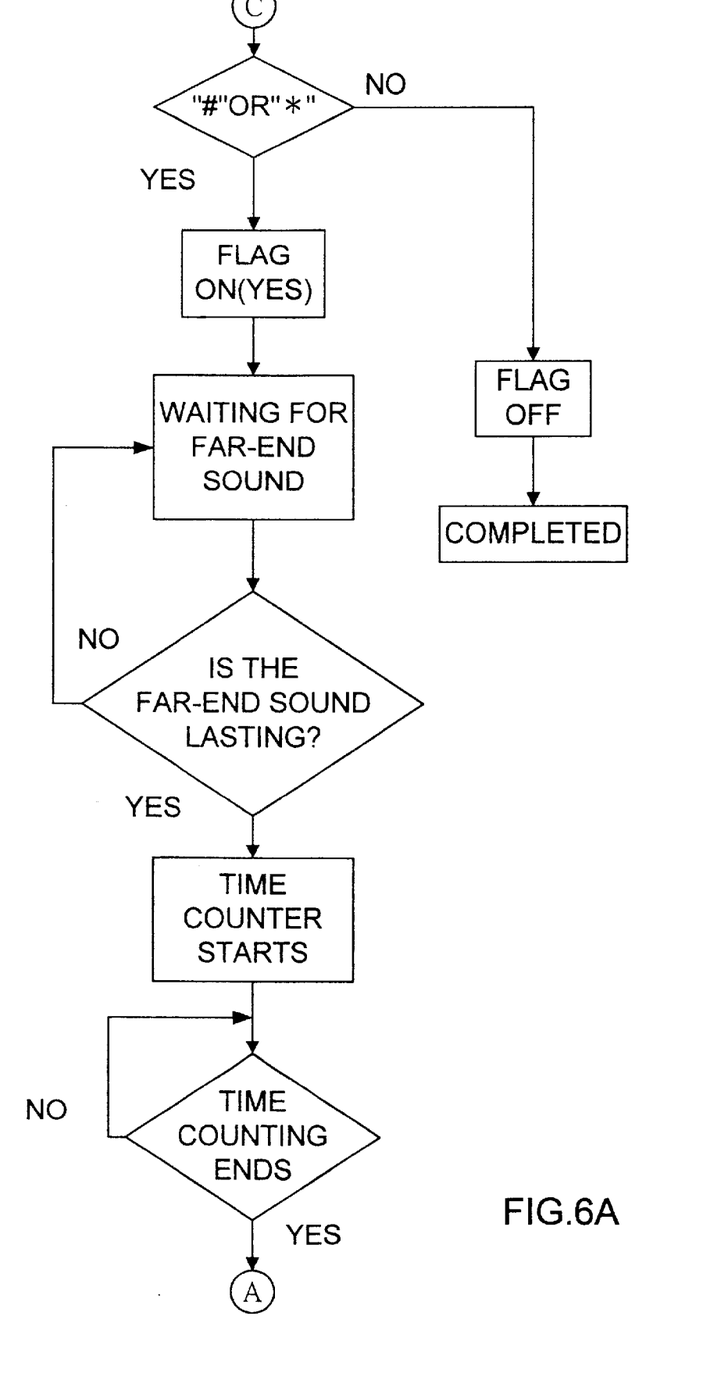
FIG. 6A is a diagram showing the other part of another operational flow chart of the second embodiment thereof.

Its operation mode is illustrated in FIG. 5. An operator makes use of simple code name, personal name or phonetic sound as the index input. As the index unit 31 confirms on the data and the data pool 32 outputs data concerning telephone numbers which will be stored in the dial temporary register 33. The dialed number is assumed to be 0227380007#512, the # mark stands for an extension. Then, the temporary register 33 sends off its codes one by one to the numerical code detecting device 34 which is responsible for checking if a code is a numerical code ranging from 0 to 9. If the codes are numerical ones, then the codes will be dialed via the dialing device 35 code by code. If a code is # or * instead of a numerical code ranging from 0 to 9, the dial control unit 36 will put off the dialing operation temporarily, waiting for the response of the far-end sound detecting device 38. If the far-end sound detecting device 38 detects the telephone is picked up at the other end (the pick-up at the other end being judged by means of time counting, or acoustic range judgement and etc.), the time counter starts to count to get a time delay until the completion of an addressing message at the far-end. Then, the DTMF generator 39 produces an extension number until a blank code appears to complete the dialing operation. Such a mode can be carried out only in a condition that the telephone system at the receiving end permits an input of an extension number from the calling end even in the course of the broadcasting of an addressing message. If the input is not permitted, as shown in FIGS. 6 and 6A, the far-end sound detecting device 38 will detect the addressing message at the receiving end and activate the flag function with its initial value set as "ON". After the dialing device makes its dial, the far-end sound detecting unit is used to detect if the sound at the far-end is lasting or not. If sound lasts, the dial control device 36 will delay the dialing operation for a period of time and then it redials until the far-end sound detecting unit receives no sound at all. Then the dial temporary register will continue to send off data whereby a phone number with an extension can be directly dialed out accordingly.

In addition, the dialing system of the present invention not only can be installed inside a hand-free system but also place inside a telephone embodiment directly to meet different environmental requirements in practical use.

It will be appreciated that although particular embodiments of the invention have been shown and described, modifications may be easily made by those who are skilled in this art after reviewing the detailed description provided herein. It is intended in the claims to cover all such modifications, which come within the true spirit and scope of the invention.

I claim:

1. An electronic phone book dialing system combined with a vehicle-installed hand-free system of a cellular phone, comprising:

an index unit, a data pool, a temporary register for dialed numbers, a numerical code checking device, a dial control device, a dialing device, a time counter and a far-end sound detecting unit, wherein:

said index unit is responsible for locating a key data stored therein for said dialing system as an abridged information related to a to-be-dialed phone number is input so that a complete phone data related to said phone number can be searched in the data pool;

said data pool is used to store telephone number data applied to said dialing system;

said temporary register for dialed numbers is used to temporarily retain telephone numbers to be dialed for said dialing system;

said numerical code checking device is used to check for said dialing system if each digit delivered from said temporary register for dialed numbers is within a range from 0 to 9 so as to discern if said digits are related to an extension number;

said dial control unit is used to stop a dialing of an extension number for a short time as a telephone of a dialed number is successfully connected at another end, permitting an addressing message of said telephone in connection to be delivered;

said dialing device is responsible for dialing out digital numbers transmitted from said numerical code checking device for said dialing system;

said far-end sound detecting device is used to detect if an addressing message at other end of a connected phone is broadcast or not;

said time counter is used to count time in a temporary holding of a dialing operation for said dialing system.

2. The electronic phone book dialing system combined with a vehicle-installed hand-free system of a cellular phone as claimed in claim 1 wherein a DTMF generator is added in combination with a near-end sound input to produce dialing sounds standing for numbers.

3. The electronic phone book dialing system combined with a vehicle-installed hand-free system of a cellular phone as claimed in claim 1 wherein said electronic phone book dialing system can be directly stored in an embodiment of a cellular phone.

\* \* \* \* \*